US009627906B2

(12) United States Patent
Chung et al.

(10) Patent No.: US 9,627,906 B2
(45) Date of Patent: Apr. 18, 2017

(54) LOAD/CHARGER DETECTION CIRCUIT, BATTERY MANAGEMENT SYSTEM COMPRISING THE SAME AND DRIVING METHOD THEREOF

(71) Applicant: FAIRCHILD KOREA SEMICONDUCTOR LTD., Wonmi-gu, Gyeonggi-do (KR)

(72) Inventors: Jinhwa Chung, Seoul (KR); Sehwan Kim, Bucheon-Si (KR)

(73) Assignee: Fairchild Korea Semiconductor LTD (KR)

( * ) Notice: Subject to any disclaimer, the term of this patent is extended or adjusted under 35 U.S.C. 154(b) by 530 days.

(21) Appl. No.: 14/136,260

(22) Filed: Dec. 20, 2013

(65) Prior Publication Data

US 2014/0176080 A1  Jun. 26, 2014

(30) Foreign Application Priority Data

Dec. 20, 2012 (KR) .......................... 10-2012-0149899

(51) Int. Cl.
*H02J 7/00* (2006.01)

(52) U.S. Cl.
CPC .......... *H02J 7/0063* (2013.01); *H02J 7/0013* (2013.01)

(58) Field of Classification Search
CPC .................................. H02J 7/0068; H02J 7/00
USPC ........................................................ 320/134
See application file for complete search history.

(56) References Cited

U.S. PATENT DOCUMENTS

| | | | | |
|---|---|---|---|---|
| 3,419,790 A * | 12/1968 | Guhn | ........................ | G05F 1/20 323/301 |
| 5,721,502 A * | 2/1998 | Thomson | .............. | H03K 17/223 327/143 |
| 6,326,771 B1 * | 12/2001 | Popescu-Stanesti | .. | H02J 7/0068 320/139 |
| 7,990,108 B2 * | 8/2011 | Aas | ........................ | H02J 7/0031 320/112 |
| 2002/0121880 A1 * | 9/2002 | Yamanaka | ............ | H02J 7/0031 320/134 |
| 2007/0029975 A1 * | 2/2007 | Martin | ................... | H02J 7/0068 320/134 |
| 2008/0100266 A1 * | 5/2008 | Sobue | ................ | G01R 31/3658 320/134 |
| 2014/0176080 A1 * | 6/2014 | Chung | ................... | H02J 7/0063 320/134 |

* cited by examiner

*Primary Examiner* — Richard Isla Rodas
*Assistant Examiner* — Dung V Bui
(74) *Attorney, Agent, or Firm* — Grossman Tucker Perreault & Pfleger PLLC

(57) ABSTRACT

Disclosed are a load/charger detection circuit, a battery management system comprising the same and a driving method thereof. The load/charger detection circuit includes a current source; a current mirror connected to the current source to copy a current of the current mirror; at least two resistors connected between a first terminal providing a corresponding voltage to a charger or a load and a power supply; and a zener diode connected between the first terminal and the current mirror.

15 Claims, 5 Drawing Sheets

LOAD/CHARGER DETECTION CIRCUIT, BATTERY MANAGEMENT SYSTEM COMPRISING THE SAME AND DRIVING METHOD THEREOF

CROSS-REFERENCE TO RELATED APPLICATION

This application claims priority to and the benefit of Korean Patent Application No. 10-2012-0149899 filed in the Korean Intellectual Property Office on Dec. 20, 2012, the entire contents of which are incorporated herein by reference.

BACKGROUND OF THE INVENTION (a) Field of the Invention

The present invention relates to a load/charger detection circuit, a battery management system comprising the same and a driving method thereof.

(b) Description of the Related Art

A battery serves to charge electrical energy and supply the charged electrical energy to various electronic devices. Particularly, a secondary battery (cell) may recharge electrical energy to be used. The secondary battery may be implemented by stacking a plurality of cells in order to increase output. The secondary battery including a plurality of cells may perform a charging operation as well as a discharging operation. In order to efficiently manage the charging operation and the discharging operation, a battery management system (hereinafter referred to as 'BMS') is mounted in the secondary battery.

When a load is connected to the secondary battery, the BMS detects the connection of the load and controls an operation of supplying a charged voltage of the secondary battery to the load. Further, when a charger is connected to the secondary battery, the BMS detects the connection of the charger and controls an operation of supplying a current from the charger to the secondary battery.

In order to detect the connection of the load or the connection of the charger, the BMS includes a detection circuit. The detection circuit generally includes a comparator and a reference voltage. However, when the comparator and the reference voltage are used, power consumption is high so that the problem may be caused when taking into account the characteristics of the battery valuing the power consumption. Particularly, even when the load or the charger is not connected, the power consumption is increased due to the comparator and the reference voltage.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a load/charger detection circuit, a battery management system comprising the same and a driving method thereof having advantages of reducing power consumption.

A load/charger detection circuit according to an exemplary embodiment of the present invention is provided. The load/charger detection circuit may include a current source; a current mirror connected to the current source to copy a current of the current mirror; at least two resistors connected between a first terminal providing a corresponding voltage to a charger or a load and a power supply; and a zener diode connected between the first terminal and the current mirror.

The load/charger detection circuit may further include a first inverter including an input terminal connected to a contact point between the at least two resistors; and a second inverter including an input terminal connected to a contact point between the current source and the current mirror.

An output of the first inverter may be a signal indicating that the charger is connected, and an output of the second inverter is a signal indicating that the load is connected.

The load/charger detection circuit may further include a resistor connected between the first terminal and the zener diode.

The current mirror may include a first transistor including a first terminal and a control terminal connected to the zener diode; and a second transistor including a control terminal connected to the control terminal of the first transistor, a first terminal connected to the current source, and a second terminal connected to a second terminal of the first transistor.

A voltage of the first terminal when the load is connected may be greater than a voltage of the first terminal when the charger is connected.

A battery management system according to another exemplary embodiment of the present invention is provided. The battery management system may include a first terminal providing a corresponding first voltage when a load or a charger is connected; a load/charger detector receiving the first voltage through the first terminal, providing a first signal when the load is connected, and providing a second signal when the charger is connected; and a controller controlling such that discharging is performed from a battery cell to the load according to the first signal, and controlling such that charging is performed from the charger to the battery cell according to the second signal, wherein the load/charger detector may include at least two resistors coupled to each other in series between a voltage source and the first terminal; a current mirror connected to a current source to copy a current of the current mirror; and a zener diode connected between the first terminal and the current mirror, and wherein the first signal may correspond to a voltage of a first contract point between the current source and the current mirror, and the second signal may correspond to a voltage of a second contact point between the at least two resistors.

A voltage of the first terminal when the load is connected may be greater than a voltage of the first terminal when the charger is connected.

The load/charger detector may include a first inverter including an input connected to the first contact point and outputting the second signal; and a second inverter including an input connected to the second contact point and outputting the first signal.

The load or the charger may be connected between a first end of the battery cell and the first terminal, and a charging switch switching according to the second signal and a discharging switch switching according to the first signal may be connected between the first terminal and a second end of the battery cell.

A method of driving a battery management system according to another exemplary embodiment of the present invention is provided. The method of driving a battery management system may include providing a current source; providing a current mirror connected to the current source to copy a current of the current mirror; providing a first terminal providing a first voltage when a charger is connected and providing a second voltage greater than the first voltage when a load is connected; providing at least two resistors coupled to each other in series between a voltage source and the first terminal; providing a first signal to a contact point between the at least two resistors by stopping the current mirror when the charger is connected; providing a second signal to a contact point between the current source and the current mirror by operating the current mirror when the load is connected; and charging or discharging a battery cell according to the first signal and the second signal.

The charging or discharging of the battery cell may include charging the battery cell according to the first signal; and discharging the battery cell according to the second signal.

The method of claim may further include providing a zener diode between the first terminal and the current mirror, wherein the zener diode may generate a breakdown voltage when the load is connected.

The method may further include providing a first inverter inverting the first signal; and providing a second inverter inverting the second signal, wherein an output signal of the first inverter may indicate that the charger is connected and an output signal of the second inverter may indicate that the load is connected.

According to an exemplary embodiment of the present invention, power consumption can be reduced using a low current source without a separate comparator and reference voltage.

Further, according to the exemplary embodiment of the present invention, even when the load or the charger is not connected, only a current of the low current source flows so that the power consumption can be reduced.

DETAILED DESCRIPTION OF THE EMBODIMENTS

Figure 1:
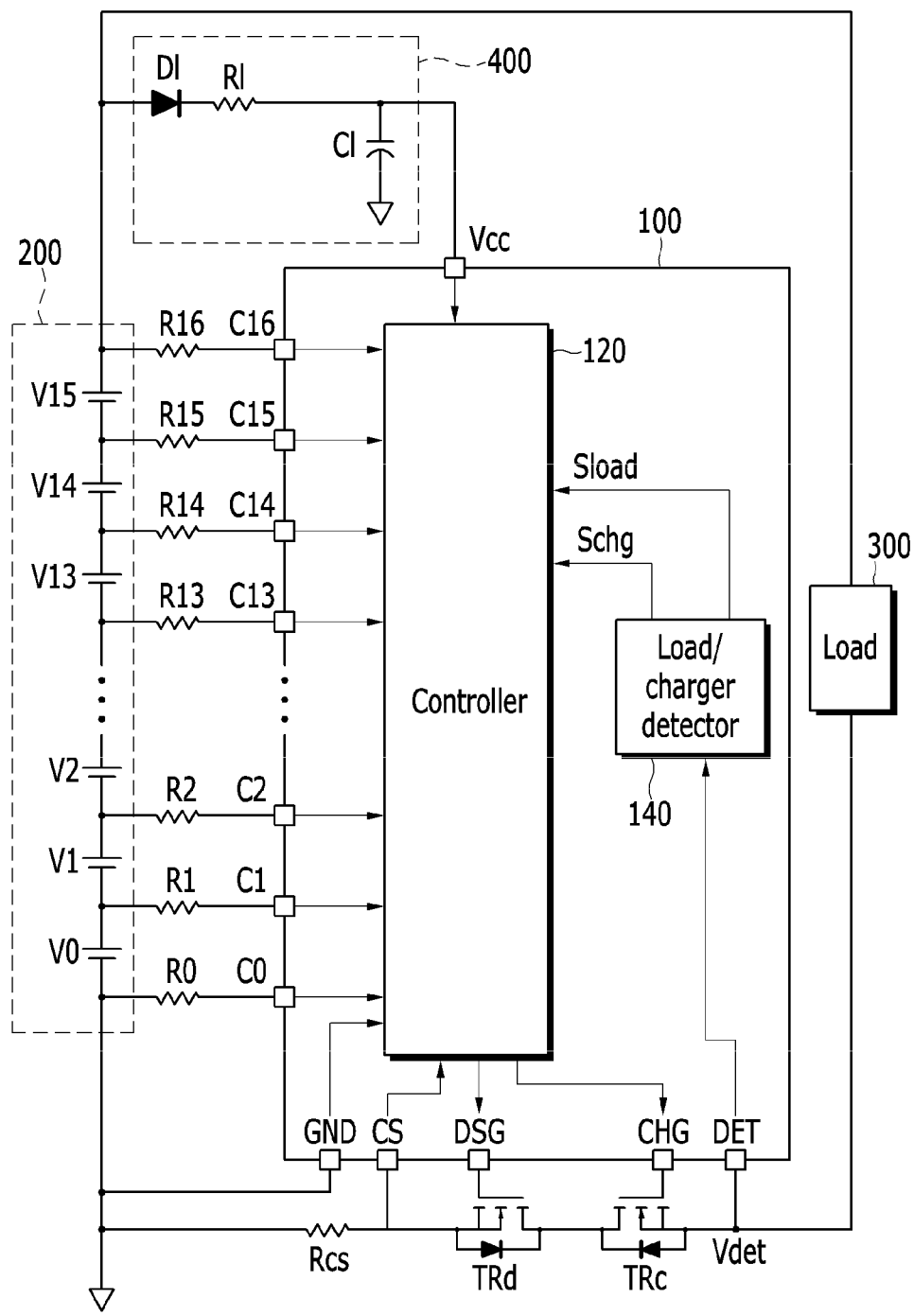
FIG. 1 is a circuit diagram illustrating a BMS and peripheral devices thereof according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element. In addition, unless explicitly described to the contrary, the word "comprise" and variations such as "comprises" or "comprising", will be understood to imply the inclusion of stated elements but not the exclusion of any other elements.

Hereinafter, a load/charger detection circuit, a BMS comprising the same and a driving method thereof according to an exemplary embodiment of the present invention will be described with reference to the accompanying drawings.

FIG. 1 is a circuit diagram illustrating a BMS 100 and peripheral devices of the BMS 100 according to an exemplary embodiment of the present invention. The peripheral devices of the BMS 100 includes a plurality of cells 200, a load 300, filter 400, a charging transistor TRc, a discharging transistor TRd, a plurality of bleeding resistors R1 to R16, and a current sensing resistor Rcs, and is connected to the BMS 100.

The cells 200 are coupled to each other in series, and each cell is charged with a predetermined voltage. Since the cells 200 are charged with the predetermined voltage, respectively, Vc1, Vc2, Vc3 . . . , and V15 are illustrated in FIG. 1. Voltages of the cells 200 are input to cell terminals C0 to C16 of the BMS 10 through the bleeding resistors R1 to R16, respectively.

The bleeding resistors R0 to R16 are connected between the cells 200 and the cell terminals C0 to C16 of the BMS 100, respectively. That is, the bleeding resistor R0 is connected between one terminal (ground) of the first cell V0 and the cell terminal C0, and the bleeding resistor R1 is connected between a contact point of the first cell V0 and the second cell V1 and the cell terminal C1. Further, the bleeding resistor R2 is connected between a contact point of the second cell V1 and the third cell V2 and the cell terminal C2. The BMS 100 receives voltage information of the cell V0 to V15 through the cell terminals C0 to C16. That is, the difference in voltages between the cell terminal C0 and the cell terminal C1 corresponds to a voltage of the first cell V0, and the difference in the voltages between the cell terminal C1 and a cell terminal C2 corresponds to a voltage of the second cell V1. The bleeding resistors R0 to R16 may be used to detect voltages of the respective cells and may be used to balance the cell voltages. Although FIG. 1 illustrates that the bleeding resistors R0 to R16 are not included inside the BMS 100, the bleeding resistors R0 to R16 may be included inside the BMS 100. In addition, the number of the cells 200 may be changed in FIG. 1. In this case, the number of bleeding resistors and the number of cell terminals may be changed.

The current sensing resistor (Rcs) is connected between the discharging transistor TRd and a ground, and the BMS 100 receives charging current information or discharging current information through a current terminal CS.

The filter 400 includes a diode DI, a resistor RI, and a capacitor CI, which is a low pass filter (LPF) for removing high frequency component (noise component) in a total voltage (V0+V1+ . . . +V15). The total voltage of the cells passing through the filter 400 is input to a terminal Vcc of the BMS 100.

The load 300 may include various electronic devices serving as a target to which power charged in the cell 400 is supplied. As shown in FIG. 1, when the load 300 is connected to the BMS 100, a discharging operation is performed. Further, as will be illustrated in FIG. 2, when a charging operation is performed, a charger 300' is provided as substitution for the load 300.

A drain of the charging transistor TRc is connected with a source of the discharging transistor TRd. A source of the charging transistor TRc is connected with the load 300 and a drain of the discharging transistor TRd is connected with the sensing resistor Rcs. A gate of the charging transistor TRc is connected with a charging terminal CHG of the BMS 100, and a gate of the discharging transistor TRc is connected with a discharging terminal DSG of the BMS 100, and switching of the discharging transistor TRc and the discharging transistor TRd are controlled by the BMS 100. When the cells 200 are charged, the charging transistor TRc is turned-on. When the cells 200 are discharged, the discharging transistor TRd is turned-on. Although the charging transistor TRc and the discharging transistor TRd are illustrated as N-type MOSFET in FIG. 1, other transistor such as a P-type MOSFET or a BJT capable of performing switch operation may be used. In addition, although FIG. 1 illustrates that the charging transistor TRc and the discharging transistor TRd are not included inside the BMS 100, the charging transistor TRc and the transistor TRd may be included inside the BMS 100.

Meanwhile, before the charging or discharging operation, that is, when the load 300 or the charger 300' is connected, the charging transistor TRc and the discharging transistor TRd maintain the turning-off state.

Further, a contact point between the source the load 300 and the source of the charging transistor TRc is connected to the detection terminal DET, and the detection terminal DET of the BMS 100 is used to detect the connected state of the load 300 or the charger 300'.

As shown in FIG. 1, the BMS 100 according to the exemplary embodiment of the present invention includes a controller 120, a load/charger detector 140, and various terminals.

The controller 120 receives voltage information of the cells V0 to V15 through the cell terminals C0 to C16, and receives total voltage information of the cells V0 to V15 through a terminal Vcc. Further, the controller 120 receives the charging current or discharging current information through a current terminal CS. In addition, the controller 120 outputs a control signal for switching the charging transistor TRc through the charging terminal CHG, and outputs a control signal for switching the transistor TRd through the discharging terminal DSG.

As illustrated above, the controller 120 according to the exemplary embodiment of the present invention turns-off the charging transistor TRc and the discharging transistor TRd before performing the discharging or charging operation. That is, the controller 120 turns-off the charging transistor TRc and the discharging transistor TRd at an initial time when the load 300 or the charger 300' (see FIG. 2) is connected. Moreover, the controller 120 detects the connection of the load 300, and turns-on the discharging transistor TRd and turns-off the charging transistor TRd in order to perform the discharging operation. The controller 120 detects the connection of the charger 300', and turns-on the discharging transistor TRd and turns-off the charging transistor TRd in order to perform the charging operation. In the meanwhile, the controller 120 may turn-on both of the charging transistor TRc and the discharging transistor TRd during the discharging operation or the charging operation in order to increase the efficiency of the battery.

Furthermore, the load/charger detector 140 according to the exemplary embodiment of the present invention receives a detection voltage Vdet through the detection terminal DET, and outputs a lode signal Sload and a charger signal Schg to the controller 120 according to the received detection voltage Vdet. When the load 140 is connected, the load/charger detector 140 transmits the load signal Sload including a detection result. When the charger 300' is connected, the load/charger detector 140 transmits the charger signal Schg including the detection result. In this case, the controller 120 controls the charging transistor TRd and the discharging transistor TRc according to the load signal Sload and the charger signal Schg received from the load/charger detector 140.

Figure 2:
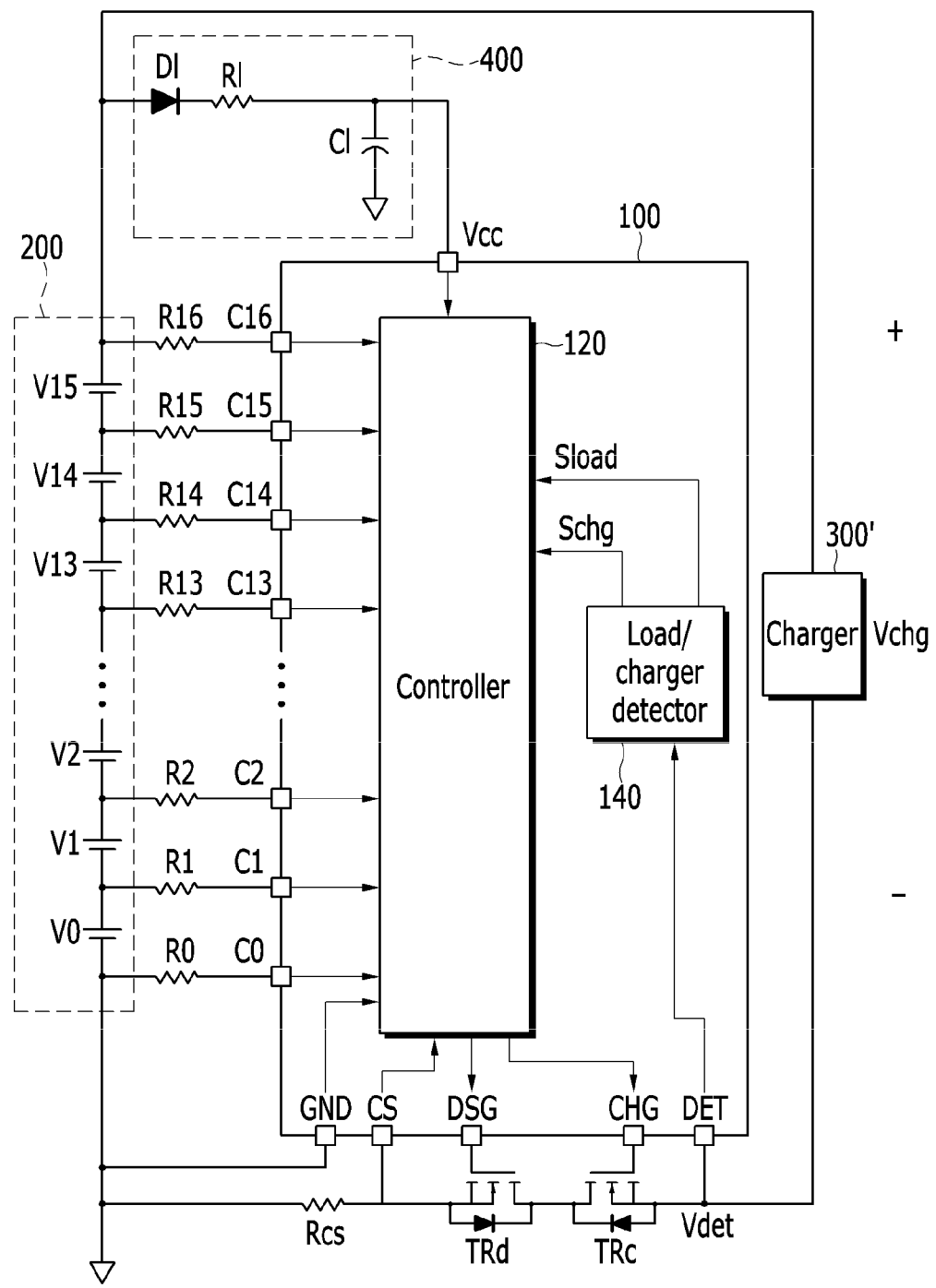
FIG. 2 is a circuit diagram illustrating a BMS and peripheral devices thereof where a charger is substituted for the load of FIG. 1.

FIG. 2 is a circuit diagram illustrating the BMS and peripheral devices thereof where the charger 300' is substituted for the load 300 of FIG. 1. A circuit of FIG. 2 is the same as the circuit of FIG. 1 except that the load 300 is substituted by the charger 300'. In this manner, a case where the charging operation is performed illustrated when the charger 300' is connected. In this case, so as to perform the charging operation, a voltage Vchg across the charger 300' is greater than a total voltage Vcc of the cells 200.

The load/charger detector 140 according to the exemplary embodiment of the present invention is a circuit arrangement for reducing the power consumption, and the following is a detail description thereof.

Figure 3:
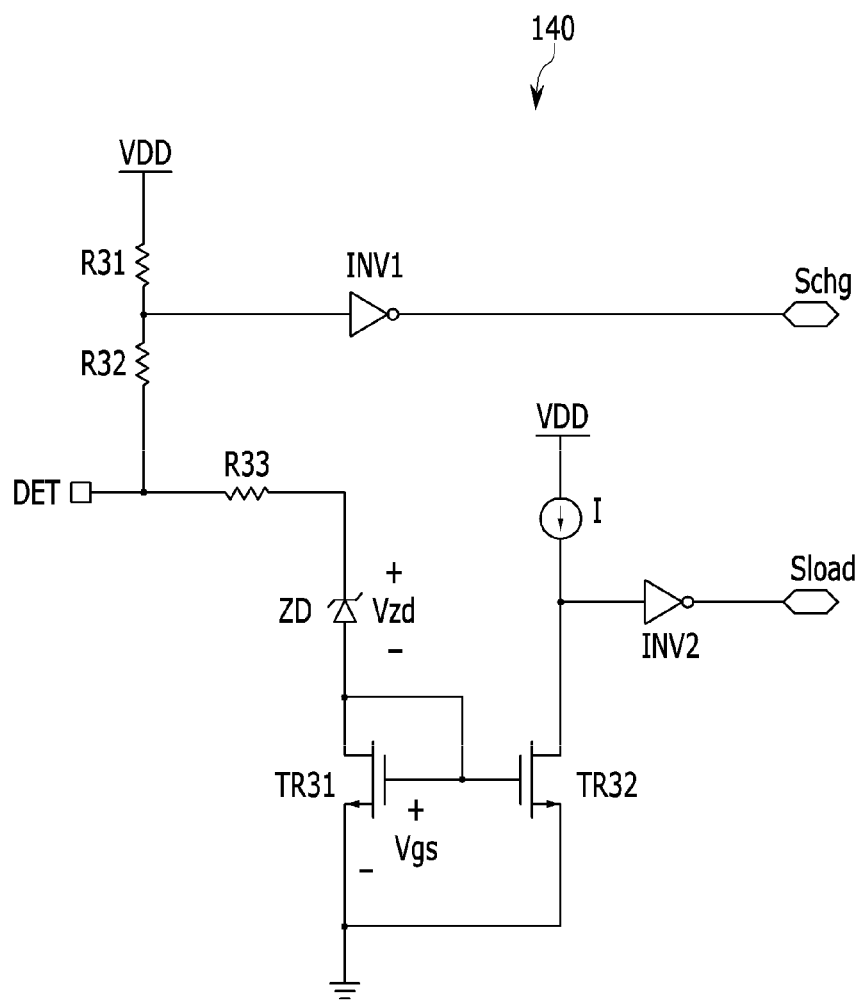
FIG. 3 is a circuit diagram illustrating a load/charger detector according to an exemplary embodiment of the present invention.

FIG. 3 is a circuit diagram illustrating a load/charger detector 140 according to an exemplary embodiment of the present invention.

As shown in FIG. 3, the load/charger detector 140 according to the exemplary embodiment of the present invention includes a voltage source VDD, a current source I, resistors R31, R32, and R33, transistors TR31 and TR32, a zener diode ZD, and inverters INV1 and INV2.

The resistors R31 and R32 are coupled to each other in series between the voltage source VDD and the detection terminal DET, and an input of the inverter INV1 is connected with a contact point between the resistors R31 and R32. In this case, an output of the inverter INV1 becomes the charger signal Schg.

One terminal of the resistor R33 is connected with the detection terminal DET, and the other terminal of the resistor R33 is connected with a cathode of the zener diode ZD. An anode of the zener diode ZD is connected with a drain of the transistor TR31. In FIG. 3, a breakdown voltage of the zener diode ZD is represented as Vzd.

A gate and the drain of the transistor TR31 are connected with each other, and a source of the transistor TR31 is connected with a ground. The gate of the transistor TR31 and a gate of the transistor TR32 are connected with each other, and a source of transistor TR32 is connected with the ground. The drain of the transistor TR32 is connected with the current source I. In FIG. 3, a gate-source voltage of the transistor TR31 is represented as Vgs. In this case, the transistor TR31 and the transistor TR32 constitutes a current mirror, and a drain current of the transistor TR31 is copied to a current (K*I) being K times of the current source I is copied in by the current mirror. The K is determined by a width between the transistor TR31 and the transistor TR32.

Further, an input of the inverter INV2 is connected with a contact point between the current source and the transistor TR32, and an output of the inverter INV2 becomes the load signal Sload.

Hereinafter, a method of detecting connection of the load or the charger by the load/charger detector 140 as illustrated in FIG. 3 will be described.

First, the following is a description of a method of detecting the connection of the charger to generate the charger signal Schg by the load/charger detector 140 when the charger 300' is connected with the cells 200 as illustrated in FIG. 2.

Figure 4:
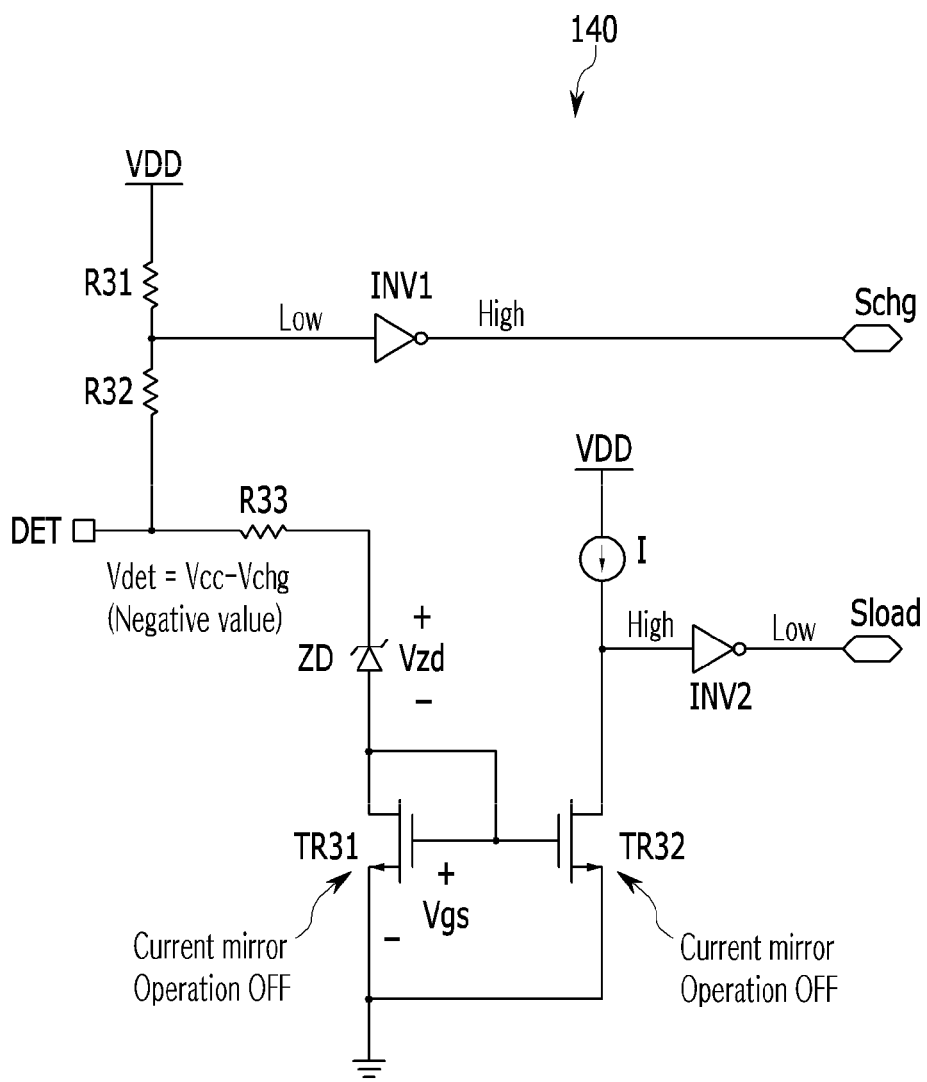
FIG. 4 is a circuit diagram illustrating an operation of a circuit of FIG. 3 when the load is connected to cells (i.e., a case of FIG. 2).

FIG. 4 illustrates an operation of the circuit of FIG. 3 when the load is connected to a cell (i.e., a case of FIG. 2).

As illustrated previously, when the charger is connected, a charging transistor TRc and a discharging transistor TRd are turned-off. Accordingly, as shown in FIG. 4, a detection voltage Vdet being a voltage of a detection terminal DET is a value obtained by subtracting a voltage Vchg across a charger from a total voltage Vcc of a plurality of cells 200. As described earlier, since the voltage Vchg across the charger is greater than the total voltage Vcc of the cells 200, the detection voltage Vdet has a negative value.

When the detection voltage Vdet has the negative value, a breakdown voltage is not generated from the zener diode ZD so that the transistors TR31 and TR32 do not act as a current mirror. Accordingly, due to voltage division of a resistor R31 and a resistor R32, an input of an inverter INV1 becomes low level (Low). Further, an output of the inverter INV1 becomes high level (High). That is, the charger signal Schg becomes high level (High).

Meanwhile, since the current mirror does not operate, the input of the inverter INV2 becomes the high level (High) but an output of inverter INV2 becomes the low level (Low). That is, the load signal Schg becomes low level (Low).

In this manner, when the charger 300' is connected with the cells 200, a load/charger detector 140 outputs the charger signal Schg of high level and the load signal Sload of low level. When the controller 120 receives the charger signal Schg of high level, the controller 120 detects connection of the charger and turns-on a charging transistor TRd for a charging operation.

Next, as illustrated in FIG. 1, the following is a description of a method of detecting connection of the load to generate the load signal Sload by the load/charger detector 140 when the load 300 is connected to the cells 200.

Figure 5:
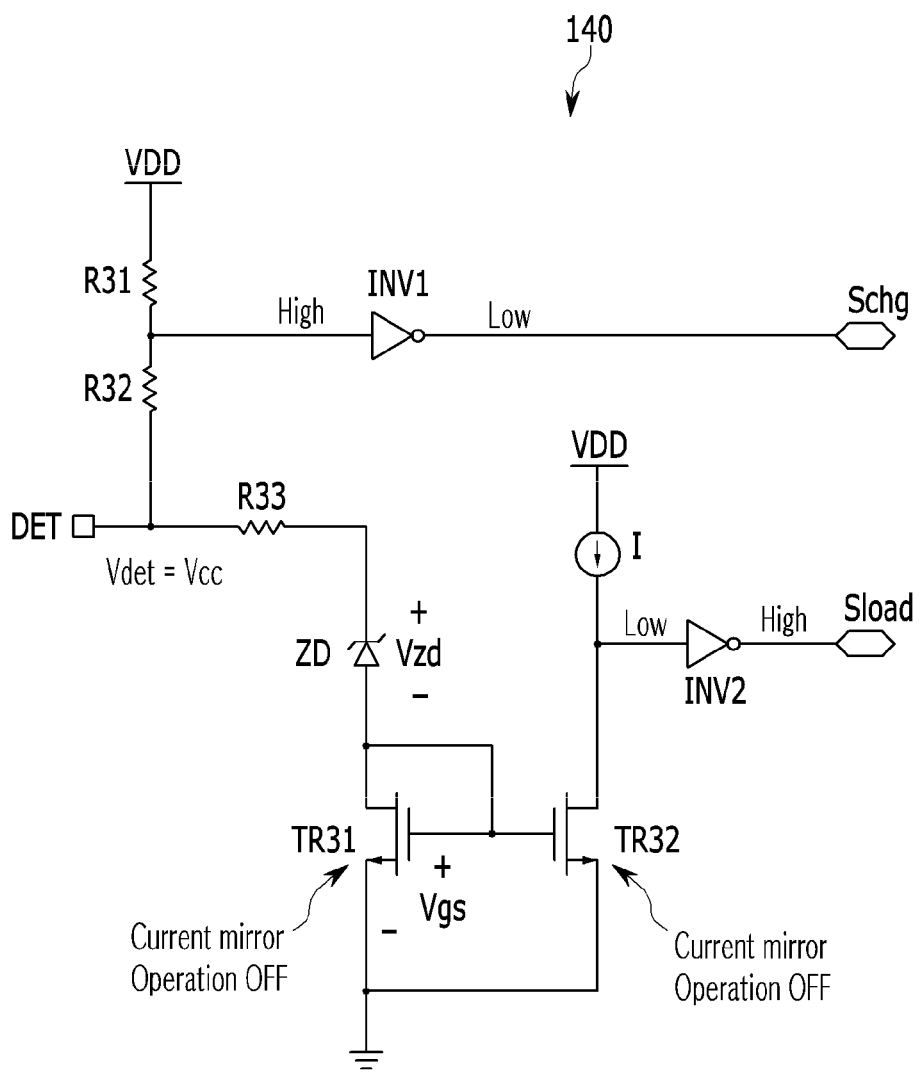
FIG. 5 is a circuit diagram illustrating an operation of the circuit of FIG. 3 when the load is connected to cells (i.e., a case of FIG. 1).

FIG. 5 is a circuit diagram illustrating an operation of the circuit of FIG. 3 when the load is connected to the cells 200 (i.e., a case of FIG. 1).

As described above, when the load is connected, the charging transistor TRc and the discharging transistor TRd are turned-off. Accordingly, as shown in FIG. 4, the detection voltage Vdet being a voltage of the detection terminal DET becomes the total voltage Vcc of the cells 200. Thus, the detection voltage Vdet is remarkably greater than a voltage Vcc-Vchg when the charger is connected.

When the detection voltage Vdet becomes the Vcc voltage, the input of the inverter INV1 becomes the high level (High) by voltage division of the resistors R31 and R32. In addition, the output of the inverter INV1 becomes the low level Low. That is, the charger signal Schg becomes low level (Low).

Further, the Vcc being the detection voltage Vdet is greater than a breakdown voltage Vzd of the zener diode+ gate-source voltage Vgs of the transistor TR31, the transistors TR31 and TR32 act as a current mirror. When the current mirror operates, the input of the inverter INV2 becomes low level (Low) and the output of the inverter INV2 becomes high level (High). That is, the load signal Schg becomes high level (High).

In this manner, when the load 300 is connected to the cells 200, the load/charger detector 140 outputs the charger signal Schg of low level and the load signal Sload of high level. When the controller 120 receives the load signal Sload of high level, the controller 120 detects that the load is connected and turns-on the charging transistor TRc for the discharging operation.

Since the load/charger detector 140 according to the exemplary embodiment of the present invention as describe above does not use a separate comparator and reference voltage but uses a current source I having a low current, power consumption may be reduced. In addition, in the load/charger detector 140 according to the exemplary embodiment of the present invention, when the detection terminal DET is open (i.e., the load or the charger is not connected), only the current source I flows so that the power consumption can be further reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A load/charger detection circuit, comprising:
   a current source;
   a current mirror coupled to the current source and configured to copy a current of the current source;
   at least two resistors coupled in series between a first terminal and a power supply, wherein the first terminal is to receive a detection voltage that varies based on whether a charger or a load is connected to a system including at least the load/charger detection circuit; and
   a zener diode coupled between the first terminal and the current mirror.

2. The load/charger detection circuit of claim 1, further comprising:
   a first inverter including an input terminal coupled to a contact point between the at least two resistors; and
   a second inverter including an input terminal coupled to a contact point between the current source and the current mirror.

3. The load/charger detection circuit of claim 2, wherein:
   an output of the first inverter is a signal indicating that the charger is connected, and
   an output of the second inverter is a signal indicating that the load is connected.

4. The load/charger detection circuit of claim 2, further comprising:
   a resistor coupled between the first terminal and the zener diode.

5. The load/charger detection circuit of claim 4, wherein the current mirror comprises:
   a first transistor including a first terminal and a control terminal coupled to the zener diode; and
   a second transistor including a control terminal coupled to the control terminal of the first transistor, a first terminal coupled to the current source, and a second terminal coupled to a second terminal of the first transistor.

6. The load/charger detection circuit of claim 1, wherein:
   a voltage of the first terminal when the load is connected is greater than a voltage of the first terminal when the charger is connected.

7. The load/charger detection circuit of claim 1, further comprising:
   a third terminal from which a charger signal including a detection result is output when the charger is connected; and
   a fourth terminal from which a load signal including a detection result is output when the load is connected.

8. A battery management system comprising:
   a first terminal providing a first detection voltage that varies based on whether a load or a charger is connected to the battery management system;
   a load/charger detector receiving the first detection voltage through the first terminal, providing a first signal when the load is connected, and providing a second signal when the charger is connected; and a controller controlling such that discharging is performed from a battery cell to the load according to the first signal, and controlling such that charging is performed from the charger to the battery cell according to the second signal, wherein the load/charger detector includes, at least two resistors coupled in series between a voltage source and the first terminal;

a current mirror coupled to a current source and configured to copy a current of the current source; and a zener diode coupled between the first terminal and the current mirror, and wherein the first signal corresponds to a voltage of a first contact point between the current source and the current mirror, and the second signal corresponds to a voltage of a second contact point between the at least two resistors.

9. The battery management system of claim 8, wherein: a voltage of the first terminal when the load is connected is greater than a voltage of the first terminal when the charger is connected.

10. The battery management system of claim 9, wherein the load/charger detector comprises:

a first inverter including an input coupled to the first contact point and configured to output the second signal; and a second inverter including an input coupled to the second contact point and configured to output the first signal.

11. The battery management system of claim 9, wherein: the load or the charger are coupled between a first end of the battery cell and the first terminal, and a charging switch switching according to the second signal and a discharging switch switching according to the first signal are coupled between the first terminal and a second end of the battery cell.

12. A method of driving a battery management system, the method comprising:

providing a current source;

providing a current mirror coupled to the current source to copy a current of the current mirror;

providing a first terminal configured to receive a first detection voltage when a charger is connected and to receive a second detection voltage greater than the first detection voltage when a load is connected to the battery management system;

providing at least two resistors coupled in series between a voltage source and the first terminal;

providing a first signal to a contact point between the at least two resistors by stopping the current mirror when the charger is connected;

providing a second signal to a contact point between the current source and the current mirror by operating the current mirror when the load is connected; and charging or discharging a battery cell according to the first signal and the second signal.

13. The method of claim 12, wherein the charging or discharging of the battery cell comprises:

charging the battery cell according to the first signal; and discharging the battery cell according to the second signal.

14. The method of claim 13, further comprising providing a zener diode between the first terminal and the current mirror, wherein the zener diode generates a breakdown voltage when the load is connected.

15. The method of claim 14, further comprising:

providing a first inverter configured to invert the first signal; and providing a second inverter configured to invert the second signal, wherein an output signal of the first inverter indicates that the charger is connected to the battery cell and an output signal of the second inverter indicates that the load is connected to the battery cell.

* * * * *